United States Patent [19]

Herlemann et al.

[11] Patent Number: 4,971,308
[45] Date of Patent: Nov. 20, 1990

[54] MOTOR VEHICLE ROOF SLIDING COVER COMPOSED OF TRANSPARENT MATERIAL

[75] Inventors: Werner Herlemann, Aidlingen; Jochen Pärisch, Herrenberg, both of Fed. Rep. of Germany

[73] Assignee: Daimler-Benz Aktiengesellschaft, Stuttgart, Fed. Rep. of Germany

[21] Appl. No.: 370,037

[22] Filed: Jun. 22, 1989

[30] Foreign Application Priority Data

Jun. 22, 1988 [DE] Fed. Rep. of Germany ....... 3822721

[51] Int. Cl.$^5$ ................................................ B60J 7/05
[52] U.S. Cl. .................................... 296/221; 296/216; 350/322
[58] Field of Search ................ 296/216, 221, 93, 84.1, 296/211, 215, 96.21; 350/319, 322; 52/311

[56] References Cited

U.S. PATENT DOCUMENTS

| | | | |
|---|---|---|---|
| 3,425,176 | 2/1969 | Cairns | 296/84.1 X |
| 4,219,230 | 8/1980 | Lapine | 296/216 |
| 4,420,184 | 12/1983 | Kaltz | 296/221 |
| 4,466,657 | 8/1984 | Kaltz et al. | 296/221 |
| 4,553,307 | 11/1985 | Kaltz et al. | 296/222 X |
| 4,671,565 | 6/1987 | Grimm et al. | 296/216 |
| 4,738,482 | 4/1988 | Bohm et al. | 296/216 |
| 4,783,117 | 11/1988 | Nagata | 296/216 |

FOREIGN PATENT DOCUMENTS

| | | | |
|---|---|---|---|
| 3442616 | 5/1986 | Fed. Rep. of Germany . | |
| 3506009 | 8/1986 | Fed. Rep. of Germany . | |
| 3708047 | 10/1988 | Fed. Rep. of Germany | 296/216 |
| 3738400 | 3/1989 | Fed. Rep. of Germany | 296/216 |

Primary Examiner—Dennis H. Pedder
Attorney, Agent, or Firm—Evenson, Wands, Edwards, Lenahan & McKeown

[57] ABSTRACT

In the case of a sliding cover of a motor vehicle slide-and-lift roof, said sliding cover being composed of transparent material and being provided with a rim moulded on integrally at the edge, said sliding cover accommodates a reinforcing frame having a peripheral integral moulding. To ensure that parts associated with the reinforcing frame do not detract from the external appearance, the integral moulding is in each case designed as a screen running in the longitudinal direction of the vehicle and projecting towards the vehicle interior.

2 Claims, 1 Drawing Sheet

U.S. Patent  Nov. 20, 1990  4,971,308
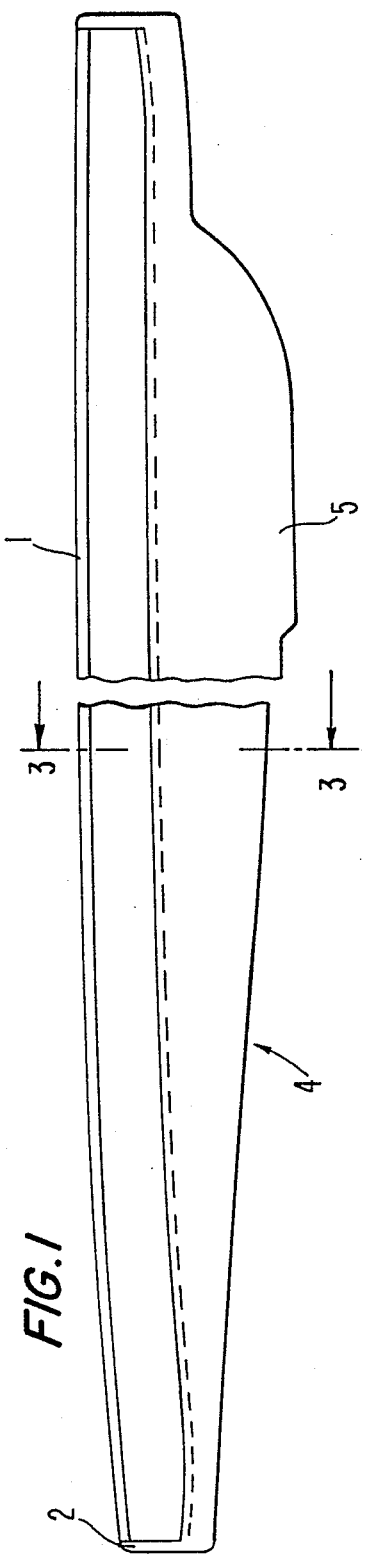
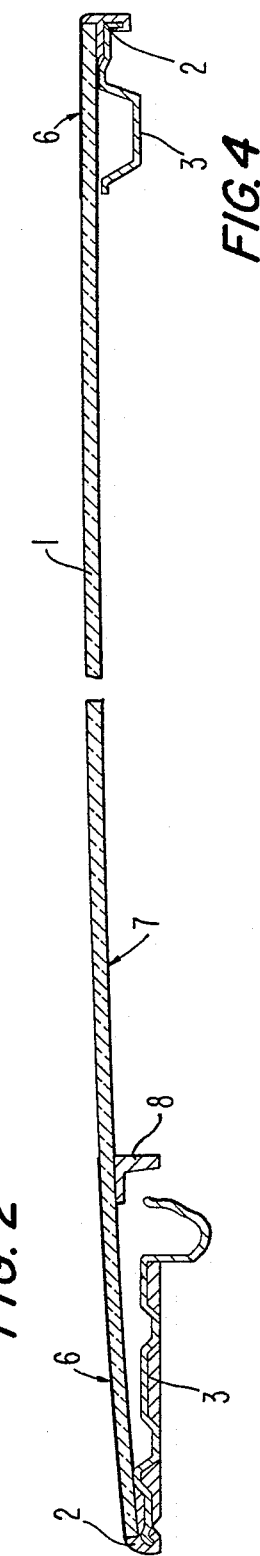
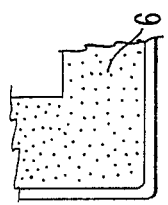
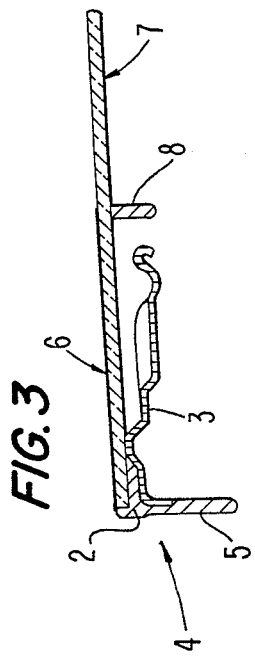

MOTOR VEHICLE ROOF SLIDING COVER COMPOSED OF TRANSPARENT MATERIAL

BACKGROUND AND SUMMARY OF THE INVENTION

The invention relates to a sliding cover of a slide-and-lift roof of a motor vehicle, said sliding cover being composed of transparent material and having a rim moulding which is moulded on integrally at the edge, at least partially embeds a reinforcing frame situated on the underside and has an integral moulding on the periphery.

A sliding cover of this kind, in which the integral moulding is designed as an accommodation channel for a circumferential edge-gap sealing profile, can be taken as known from German Published Unexamined Patent Application ('00S) 3,506,009. If the sliding cover forms a part of a slide-and-lift roof, actuating elements which bring about a lift position and which, at least in the raised position, Can been seen from outside, act on the underside.

It is an object of the invention to conceal attachments and components of the movement mechanism which are arranged on the underside of the sliding roof from view from outside in order to achieve a harmonious and stylistically satisfactory integration of the transparent sliding cover into the bodywork.

This object is achieved by providing a sliding cover arrangement wherein the integral moulding is in each case designed as a screen extending in the longitudinal direction of the vehicle and projecting towards the vehicle interior.

Although German Patent 3,442,616 has already disclosed the provision of strip-shaped screens essentially perpendicular to to cover surface and essentially flush with the cover edge at the two longitudinal sides of the cover, these screens, forming separate components, are connected firmly to the cover in a separate operation along their upper edge.

Better protection against looking in is achieved if the sliding cover has a circumferential, strip-shaped region which obscures the reinforcing frame from view from above and is bounded on the underside of the cover by an angled edge piece which is moulded on integrally and conceals actuating elements on the frame.

The strip-shaped region can be produced by screen printing and be in the form of a pattern of dots or a circumferential band.

It is particularly expedient if the angled edge piece is moulded on integrally in the same operation as the surround according to especially preferred embodiments.

Other objects, advantages and novel features of the present invention will become apparent from the following detailed description of the invention when considered in conjunction with the accompanying drawings.

BRIEF DESCRIPTION OF THE DRAWINGS

FIG. 1 shows a side view of a sliding vehicle roof cover with an integral rim moulding in the form of a screen, constructed in accordance with a preferred embodiment of the invention;

FIG. 2 shows a central longitudinal section through the cover according to FIG. 1; and FIG. 3 shows a section taken along line III—III in FIG. 1; and FIG. 4 is a top, partial view of one embodiment of the roof wherein a pattern of dots is employed to produce a strip-shaped region.

A DETAILED DESCRIPTION OF THE DRAWINGS

A slide-and-lift roof not illustrated in greater detail has a sliding cover 1 which is composed essentially of a transparent material, such as glass, and is provided at the edge with an integrally moulded surround or rim 2. A reinforcing frame 3 composed of sheet metal and supported on the glass with the interPosition of a damping means is embedded at least partially in said rim, with which reinforcing frame 3 attachments and components of the movement mechanism are associated in a manner not shown. Joined to the rim 2 at the periphery is an integal moulding 4 (FIGS. 1 and 3), which is designed as a screen 5 which extends in the longitudinal direction of the vehicle and conceals the above-mentioned attachments and components of the movements mechanism from the direction of the vehicle doors.

In order to ensure that the reinforcing frame and parts associated with it are also screened from view from above, the sliding cover 1 is provided with a strip-shaped region 6 running around the edge which, for the purpose of clarification, has a thickness which is not to scale in FIGS. 2 and 3. This region 6 which can also be applied to the underside 7 of the cover, is expendiently produced by screen printing and can be in the form of a pattern of dots or in the form of a band.

A lateral view from above of actuating elements in the forward and in the lateral cover regions is prevented, as FIGS. 2 and 3 show, by an angled edge piece 8 projecting from the underside 7 of the cover. This angled edge piece 8 is moulded on integrally in the same operation as the surround or rim 2.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Sliding cover of a motor vehicle slide-and-lift roof composed of a transparent material and having a rim which is integrally molded at a side edge of the roof and which, on a peripheral side, has an integral molding projecting downwardly by and extending in a vehicle longitudinal direction to constitute a screen, when the sliding cover is tilted up, to prevent view of the cover interior from outside, a generally horizontally disposed reinforcing frame partially embedded in the rim, and an angled edge piece integrally molded to an underside of the cover and spaced and separate from both the screen and the reinforcing frame for obscuring from view the space between the screen and the angled edge piece, and a surrounding strip-shaped region provided on the sliding cover to obscure from view from above an exposed area of the reinforcing frame, wherein the angled edge piece is located at a boundary of the strip-shaped region.

2. Sliding cover according to claim 1, wherein the strip-shaped region is one of a pattern of screen printed dots and a screen printed circumferential band.

* * * * *